Oct. 28, 1924.

E. W. SALMON, JR

1,513,426

FILM CABINET

Filed Aug. 3, 1922

E. W. SALMON, JR

FILM CABINET

Filed Aug. 3, 1922

E. W. SALMON, JR

1,513,426

FILM CABINET

Filed Aug. 3, 1922

E. W. SALMON, JR 1,513,426

FILM CABINET

Filed Aug. 3, 1922
8 Sheets-Sheet 8

Inventor
Edward W. Salmon, Jr.,

Witness:
Robert F. Beck

By
Attorney

Patented Oct. 28, 1924.

1,513,426

UNITED STATES PATENT OFFICE.

EDWARD W. SALMON, JR., OF BALTIMORE, MARYLAND, ASSIGNOR TO LEO FESENMEIER, OF BALTIMORE, MARYLAND.

FILM CABINET.

Application filed August 3, 1922. Serial No. 579,451.

*To all whom it may concern:*

Be it known that I, EDWARD W. SALMON, Jr., a citizen of the United States, residing in the city of Baltimore and State of Maryland, have invented new and useful Improvements in Film Cabinets, of which the following is a specification.

This invention relates to film cabinets, and has to do particularly with the filing, storage and preservation of motion picture films.

Motion picture films, both negatives and positives, are composed of highly inflammable material, and are particularly susceptible to heat transmitted thereto either directly or indirectly, and once afire, it is difficult, if not impossible, to extinguish or smother the fire. It is just as essential that safe and proper means be provided for the transportation of the films from city to city or from place to place, as it is to care for them safely and properly in a building, in order to preserve the films against loss by fire and atmospheric conditions as well as to protect them from accidental destruction during transportation. There is not only danger from flames, incident to fires, but there is great danger to life, limb and property incident to explosion in the event of fires where motion picture films are stored. The safety of the public in motion picture houses and buildings, in which these picture films are used or stored, has given so much concern to municipalities and to individuals, that it has been found absolutely essential to provide and enforce very strict legislation to protect the public against the loss of life and limb and property incident to fires and explosions.

When it is realized that many films cannot be reproduced, and considering the great inherent value of such films, aside from their large earning capacity, and the great monetary loss if destroyed by fire, or through atmospheric or other conditions or disasters, it is obvious that the value of the films warrants the utmost precaution in the matter of their preservation as well as to guard against the aforesaid danger to the public and to property.

To overcome the dangers aforesaid, and to otherwise meet specified legislation, various types of cabinets and receptacles have been provided or proposed for the storage and safekeeping of the films. Cabinets or receptacles having separate compartments therein have been proposed for the filing and storing of the films, but there has still remained the danger of a rapid spread of fire in the event of a film in one compartment becoming ignited and the flames, fumes, gases and heat transmitted from one compartment to another, rapidly igniting one film after another with a consequent great loss of valuable films and property. A sheet metal type of container has been used, but owing to its frailty and its heat conducting properties, heat, in the event of fire, is readily transmitted through the walls of such containers or from one container to another and the films are not properly protected against damage in the event of a fire or in the event of concussion incident to internal explosions or external explosions or wrecks in transit from one place or city to another.

Prior to my inventions no adequate filing system for motion picture films has been devised, and no proper and sufficient storage facilities have been provided for the care and protection of hundreds of thousands of dollars worth of films impossible of reproduction except at extraordinary expense, if at all; and no safe and proper means has been provided for the protection of life, limb and property; or for the transportation of the films from place to place or city to city; and it is therefore apparent, from the foregoing, that it has been highly essential to protect the films from fire and buildings from becoming wrecked, incident to explosion, whether due to fire or spontaneous combustion while the films are filed away for frequent use or in storage for predetermined periods or in transit from one place to another. It is also apparent that municipalities, insurance companies, property owners and the public generally, are greatly concerned in the prevention of the danger surrounding the use and storage of motion picture films.

It is therefore one object of my present invention to provide a system for filing and storing and transporting motion picture films which embodies a strong, durable, fireproof structure designed to protect the films from fire, heat, spontaneous combustion, atmospheric conditions, and all of the dangers which may arise with regard to damage to the films and injuries to the public and property.

Another object of my invention is to provide means for filing and storing motion picture films, embodying a system characterized by means whereby, in the event of fire, the filed or stored films may not be subjected to flames or heat and whereby in the event of a fire taking place among the filed or stored films, incident to spontaneous combustion or in some other way, the fire and heat will be prevented from spreading to other filed or stored films in the system, in which means is provided for carrying the gases, fumes and smoke away from the system outside of the building to the atmosphere, without danger of the gases, fumes and smoke coming into contact with the surrounding films or property adjacent the system, and in which the poisonous and otherwise dangerous gases and fumes are absorbed or destroyed or prevented from causing damage and injury upon discharge from the building to adjacent outside surroundings or to the public.

A still further object of the invention resides in the provision of a filing and storing cabinet which may be constructed in separable interlocking units or sections in a building with the sections having communication with a chimney or other shaft or flue so that the fumes and gases, in the event of a fire, may be carried off to the atmosphere.

A still further object of the invention resides in the provision of a filing cabinet for motion picture films composed of separable units which may be readily interchanged and stacked both laterally and vertically, with each section provided with one or more compartments for the reception of the films, which may be classified in the cabinet in any suitable manner, and in which cabinet means is provided in each compartment for cooperation with the door of each compartment to maintain the doors normally closed so as to prevent possibility of accidental fires, due to carelessness, or otherwise.

A still further object is to provide a cabinet composed of separate compartments in which the films may be filed or stored so that they may be readily accessible and in which the records or films are so separated from one another that in the event one might catch fire, the flames and the heat, and the gases and fumes cannot come into contact with adjacent records or films, and in which the products of combustion or generation of gases or odors which may be dangerous, offensive or otherwise objectionable, may be carried away from the adjacent records or films to the outside of the building and discharged to the atmosphere.

It is still further designed to provide a strong, safe, fireproof filing cabinet for moving picture films or other destructible articles, records, or similar matter, which may be readily moved from place to place or transported from city to city without likelihood of damage in the event of fire or wrecks and in which the contained record material is preserved against the action of atmospheric conditions.

It is still further designed to provide a fireproof cabinet for storing combustible material with the cabinet provided with means whereby to exhaust gases generated by combustion in the container to the outside atmosphere so as to relieve the cabinet of internal pressure and thereby prevent explosions and also to prevent the exit of the gases, fumes or other odors into the building or room in which the cabinet is located.

It is still further an object of the present invention to provide means for the support of a fire proof filing and storage cabinet for moving picture films so as to prevent the precipitation of the cabinet into a cellar in the event of falling floors incident to fires, earthquakes, vibrations, or from other causes.

With the above and other objects in view the invention consists in the construction and novel combination and arrangement of parts hereinafter fully described, illustrated in the accompanying drawings and pointed out in the claims hereto appended, it being understood that various changes in the form, proportion and minor details of construction, within the scope of the claims, may be resorted to without departing from the spirit or sacrificing any of the advantages of the invention.

In the drawings, in which like characters of reference designate corresponding parts in the several views:—

Figure 18 is a view partly in end elevation and partly in vertical section illustrating one embodiment of a lower or base type of unit or section.

Figure 1:
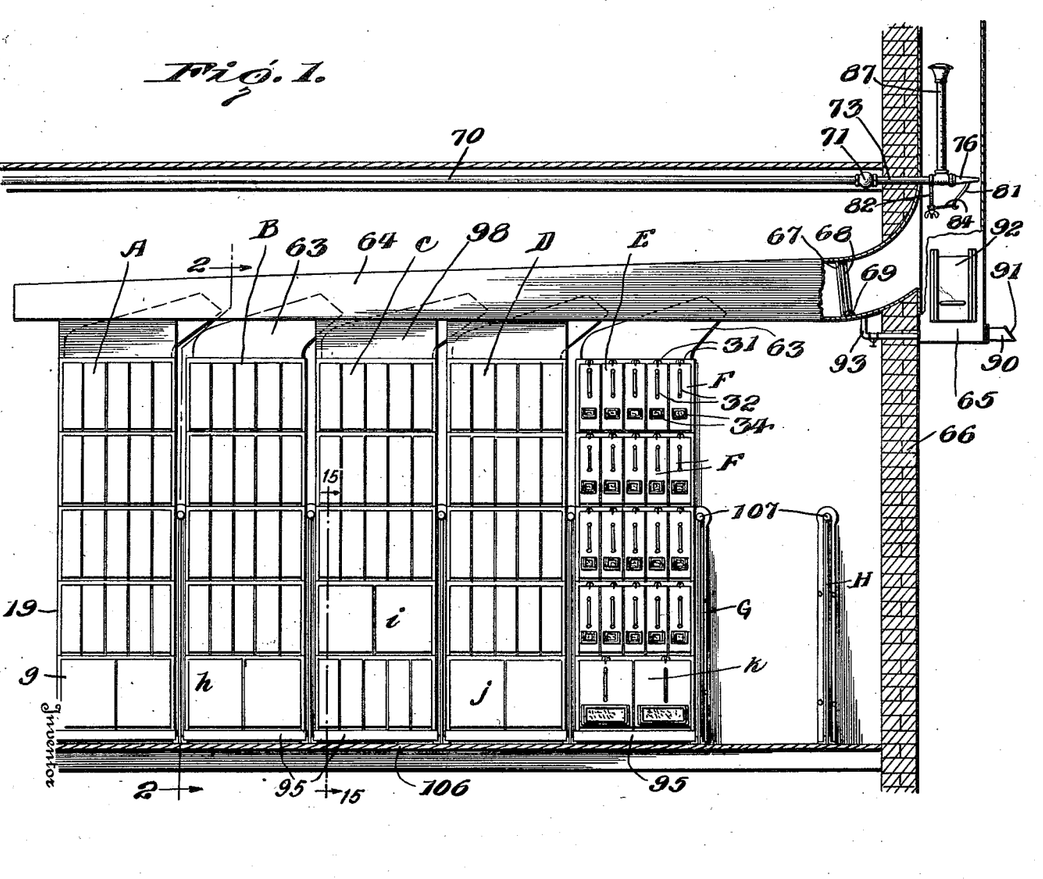
Figure 1 is a front elevation of my invention, partly in section, illustrating a plurality of tiers of cabinets as they may be mounted in a room or building.

Referring now more particularly to the accompanying drawings, there is illustrated embodiments of my invention in which the cabinets are built up of separate interchangeable, interlocking units or sections, there being shown in Fig. 1, for instance, a plurality of tiers of cabinets A, B, C, D and E, composed of separable units or sections. Each unit or section is formed en bloc and comprises a body of non-combustible, non-heat conducting material 18, preferably diatomaceous earth, which may or may not be enveloped in a casing of relatively thin sheet metal 19 and in which body is molded or otherwise formed, film receiving compartments 20 having relatively thick walls. The upper portion of the rear wall of each compartment 20, except the compartments in the units g, h, i, j and k, being shown as it may be in one embodiment of the invention, on a forward ported incline, as indicated at 21, for a purpose presently explained.

Each compartment is provided with a door opening and the edge of each compartment adjacent the door opening has a peculiar form of jamb. For instance, at the top, bottom and side edges of the door opening, the walls of each compartment have a continuous surrounding rib 22 adjacent which and surrounding the rib is a continuous groove 23.

The door F is composed of a relatively thick body of non-combustible, non-heat conducting material enveloped in a relatively thin sheet of metal, and like the walls of the compartment, it is therefore fireproof. Each door F, around its inner face, has a formation corresponding to the formation of the respective door jamb, that is to say, each door, on its inner side adjacent the edge thereof, is provided with a continuous rib 25 and an adjacent continuous groove 26, the rib 25 being adapted to fit tightly within the groove 23 of the door jamb and the continuous groove 26 of the door being adapted to tightly receive the rib 22 of the door jamb, there being resilient material 27, of any suitable character, disposed in said grooves against which the said ribs impinge and thereby provided for a double sealed joint between the door and the jamb at each edge of the door to prevent the egress of gases, if any, and to prevent the ingress of gases, if any, or moisture from the room or building in which the cabinet may be located.

Each door of each compartment is hinged in any suitable manner, as at 28, adjacent the bottom of the respective compartment, and through the instrumentality of means hereinafter described, the door is prevented from swinging to an open position beyond dead center and caused to automatically move to closed position. Upon moving to closed position the doors are automatically locked through the instrumentality of any suitable locking means, as for instance, the gravitating latch 29, pivoted at 30 to the hanger 31. The normal position of the latch 29 prevents opening of the door except through manipulation of the latch, the pivotal mounting 30, however, permitting an upward movement of the latch under the influence of the upper edge of the door when the latter swings automatically to closed position so that immediately upon the upper edge of the door clearing the latch, the latter gravitates to its normal position and maintains the door locked, thereby precluding ingress of moisture or gases or the outflow of fumes or gases from the compartment in the event of a fire in the compartment. The door may be opened by grasping a suitable handle 32 secured by bolts 33 or otherwise to the door, and then lifting the latch 29. Each door may be provided with an index tab holder 34 of any suitable character to provide for classification or indexing of films or records.

I have described means whereby to provide against any possibility of gases or fumes escaping from one compartment to an adjacent compartment between the doors and door jambs, and I also strengthen portions of the door jambs, that is, the division walls between the compartments of each unit or section by means of a suitable reinforcement, preferably in the nature of a longitudinally corrugated member or plate 35, which has its outer longitudinal edge spot welded or otherwise fastened to the metallic envelope, substantially midway between the side faces of the division walls of the compartments, as at the point 36, to thereby effectually anchor the sheet metal envelope to the division walls. There is thus provided a compound or double leak preventing means between adjacent compartments at each edge of each compartment with a further means for the same purpose, that is, the corrugated plate 35, interposed between the aforesaid sets of coacting door jamb and door ribs and grooves, for preventing leakage and which performs the further function of strengthening the division walls at their front edges and anchoring the sheet metal envelope to the insulating division walls.

Figure 8:
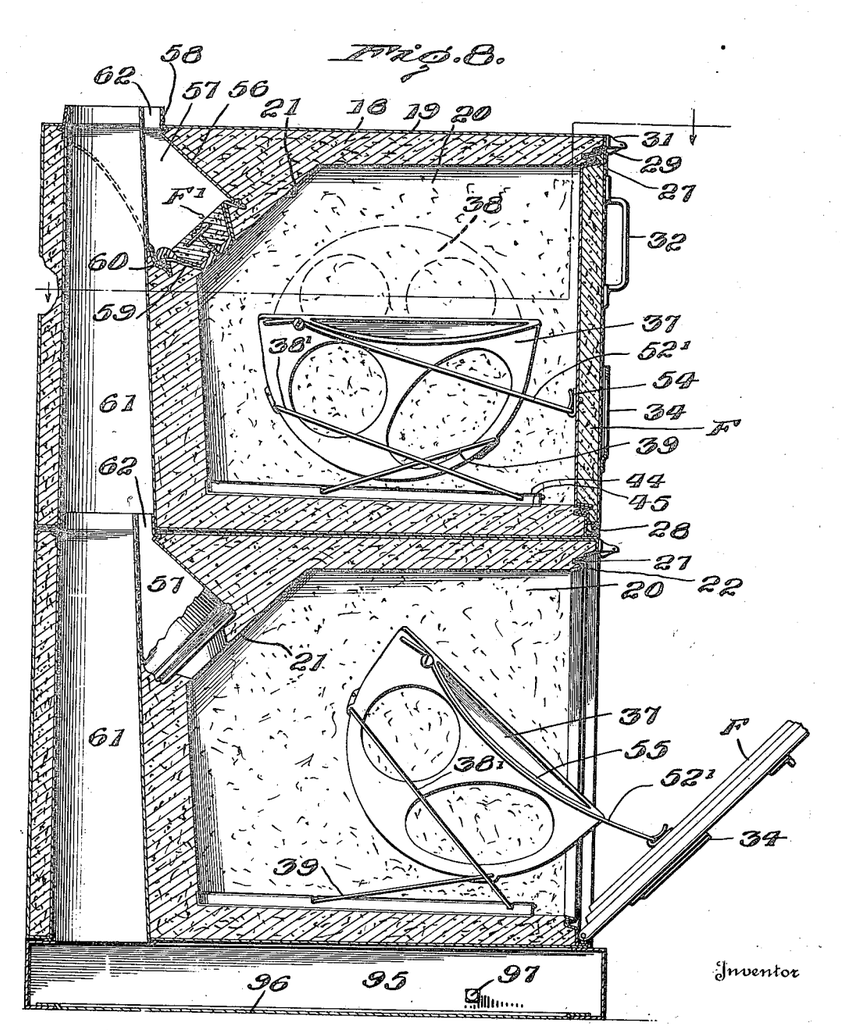
Figure 8 is a vertical sectional view, illustrating two compartments of two superimposed units or sections, the upper compartment showing the door of the compartment normally closed and the film holder in normal filing or storage position, the lower compartment showing the door opened and the holder tilted to permit removal of the film from the holder.
Figure 9:
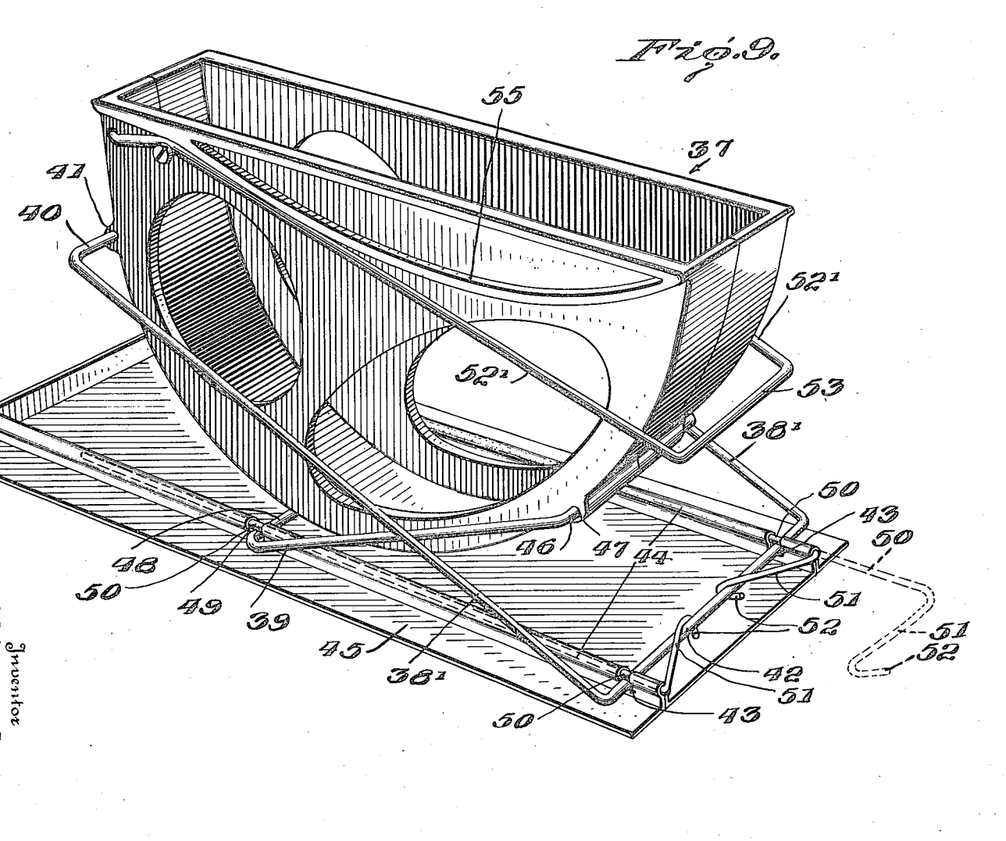
Figure 9 is a detail perspective view of the film or record holder.

To effect the aforesaid automatic closing of the door of each compartment, I provide each compartment with a pivotally mounted film holder 37 and connect same with the respective door. Each holder is substantially semi-circular for the reception of the film reel 38 carrying the film and it is mounted for a rocking movement in the respective compartment in any suitable manner. One manner of means of rockingly mounting the film holder is shown particularly in Figs. 8 and 9, wherein, in the upper part of Fig. 8, the door is closed and the holder shown in normal position, and wherein, in the lower portion of Fig. 8, the door is shown in open position with the holder rocked forwardly to permit access to the film and removal from the holder. To permit the necessary rocking movement of the holders for the purposes stated, and for the purposes of illustration, each holder 37 is swingingly supported above the floor of the compartment on two pairs of arms 38' and 39, the arms 38' being longer than the arms 39. The arms 38' have inwardly directed portions 40 pivotally fitted in sockets 41 at the rear of the respective holder with their opposite ends connected by a connecting bar 42 adapted to rest in seats 43 formed in hollow upstanding parallel ribs 44, rising from the base plate 45. Each base plate 45 is fixedly secured in the bottom of the respective compartment. The outer ends of the arms 39 are directed inwardly, as at 46, for a pivotal fit in the sockets 47 of the holder. The inner ends of the arms 39 are connected by a bar 48 adapted to rest in seats 49 of the aforesaid parallel hollow ribs 44. To fasten the bars 42 and 48 in their seats 43 and 49, locking pins 50 are provided for a sliding movement into and out of the longitudinal hollow ribs 44 and which engage transversely over the connecting bars 42 and 48 resting in the seats 43 and 49, as shown particularly in Fig. 9. These locking pins 50 may be secured against accidental displacement in any suitable manner, but the locking pins shown are flexible, and the outer ends of the pins are deflected inwardly, laterally toward each other, as at 51, with the inner ends of the deflected portions 51 provided with hooks 52 adapted to spring over and embrace the connecting bar 42 of the links 38. These pins 50 and their deflected portions 51 are resilient, with the result, that the hooked ends 52 of the portions 51 may be readily snapped over the connecting bar 42 or released therefrom to permit of a disconnection of the holder from the respective base plate 45, if desired.

Each holder has connection with the respective door in any suitable manner, but as shown, there is a substantially U-shaped link 52', which has the inner ends of its legs fixedly secured to the sides of the holder adjacent the rear upper end thereof, with its bight portion 53 snapped or otherwise detachably secured in the clip 54 secured to the inner face of the door. The mounting of the holder and the connection between the holder and the door prevents the door from being opened to a point beyond a dead center line with the result that upon the release of the door by the operator, the holder rocks backwardly quickly and thereby sharply closes the door. To facilitate the quick sharp action in the matter of closing the door, under the influence of the holder, the holder is provided on each side with a laterally projecting elongated cam rib 55, which, at its inner end, lies against the inner ends of the legs of the link 52' and as the door is swung open on its hinge 28, the pulling action on the link 52' swings the holder forwardly with the door and causes the cam ribs 55 of the holder to ride upon the legs of the link 52' and bend the same through the resiliency of the legs of the link 52' to an extent as to cause the legs of the link to be placed under considerable tension, which acts, when the door is released, to give a snap like action to the holder and thereby quickly close the door. The doors should be maintained closed to keep out moisture from the room and to maintain the compartments sealed; hence, the value of the automatic closing of the doors when released by the operator. Also, by virtue of maintaining the compartment doors locked, except when held open by the operator to file or remove a film from the respective holder, there is less likelihood of danger of deterioration incident to moisture, or a fire due to neglect or carelessness.

Formed in each compartment 20, having the ported inclined wall 21, is an upwardly directed recess 56 in which is located a tubular passage 57 terminating at its outer end in a relatively short upstanding tubular extension 58 designed to provide for an interlocking connection between the separate superimposed sections or units as will be later explained.

If fire should take place in a compartment, it is desirable that the fumes, gases and odors be not permitted to gain access to the room or building in which the cabinet is located. As has been stated the doors have a sealed connection with the door jambs to prevent such a possibility. In the event of a fire in a compartment, the expansion of gases would have a tendency to blow open the door or affect the walls of the cabinet, due to an explosion, unless means be provided to prevent the expansion of the gases and permit their discharge from the respective compartment. To this end, I provide a fire proof valve F' and interpose it between the respective passage 57 and the respective compartment. It is my purpose to so construct the valve F' and to seat it so as to prevent the ingress of moisture to the compartment and yet operable in the event of the expansion of gases to permit the gases, fumes and smoke to pass from the compartment to the atmosphere without danger of permitting the gases to enter other compartments and with the assurance that the walls of the compartment, in which the fire may have occurred, as well as the door thereof, being relieved of internal pressure. To this end, a tapering port or valve seat 59 is formed in the inclined wall 21 of each compartment which has such an inclined wall, and this tapering seat 59 is designed to snugly receive the tapering valve F', which is pivoted at 60, within the passage 57, in such a way as to have a normal gravitating movement toward the valve seat so as to maintain the communication between the compartment and passage 57 through the ported wall 21 closed and adapted to unseat only in the event of internal pressure within the compartment.

An upwardly tapering flue 61 is imbedded in each compartment of all units, except units g, h, i, j and k, and each flue 61 extends from the bottom edge of the respective compartment to a point above the upper outer face of the respective compartment, terminating at the upper edge in the upstanding flange or collar 58 and lying adjacent one wall of the collar 58 to provide a passage 62 which is substantially crescent shaped in cross section between the collar 58 and the upper end of the respective flue 61. The collar 58 is designed to fit within the lower end of the flue 61 of the unit or section next above, and as there is a plurality of these collars 58 on each section, as illustrated it is clear that a substantial interlocking connection is effected between the units or sections, and by virtue of the crescent shaped passages 62, any gases or fumes passing from a compartment, will pass through the respective crescent shaped passage 62 and into the flue 61 of the compartments thereabove, where the gases or fumes finally pass upwardly into an exhaust chamber 63 from which the fumes and gases pass into a duct 64 to a flue 65 arranged outside of the building, and where a number of tiers of built up sectional cabinets are employed, as illustrated in Fig. 1, it will be understood that there is an exhaust chamber 63 at the top of each cabinet and which has communication with the duct 64 which latter is therefore common in the matter of communication with all of the exhaust chambers 63. Each exhaust chamber 63 is directed laterally of the respective cabinet and upwardly upon an incline with its discharging end disposed above the bottom of the duct 64 for the purpose of deflecting the gases into the duct 64 in such a way as to carry or deflect them past the outlet ends of the exhaust chambers in advance thereof, the draft flue 65 creating the suction to carry the escaping gases off rapidly. However, if there should be any back pressure or any tendency of escaping gases, to flow back into any of the exhaust chambers 63, such gases cannot find way into other compartments because of the respective valves F', which, therefore, not only excludes moisture but also any possibility of escaping gases finding its way back into a compartment.

The duct 64 is formed somewhat trumpet shaped or flares outwardly through a side wall 66 of the building and by virtue of its trumpet or flaring shape and its communication with the flue 65, a strong draft is created. In the trunk line duct 64, there is disposed a window frame 67 carrying a thin pane of glass 68. The frame is preferably hinged at its lower side, as at 69 and is set upon a slight inclination in a direction toward the cabinets, as shown in Fig. 1, so as to maintain the window normally in closed position. The purpose of this window is to prevent the ingress of back drafts or moisture from the flue 65 and thereby aiding the valves F' in protecting the contents of the respective compartments, particularly from moisture.

In the event of a fire in one of the compartments, the pressure of the fumes, smoke and gases passing through the duct 64 throws or tilts the frame and its glass on its hinge and permits escape of the gases from the duct 64 to the flue 65. If the pressure should not affect a swinging movement of the window frame, the heat from the fumes and gases would break the glass therein, due to the thinness of the glass, and pass on to the flue 65.

To take out of the escaping gases the combustible properties thereof, prior to their exit from the flue 65, and also to eliminate the escape of poisonous gases and unpleasant odors to the possible injury of surrounding properties and persons in close proximity to the plant, I provide a sprinkler system operable preferably by a thermocontrolled device, as illustrated particularly in Figs. 1 and 12 to 14, inclusive. To this end, I provide a water supply pipe 70 which leads into the building from the water main (not shown) and which, in this instance, I locate at a point above the cabinets, as shown in Fig. 1. A valve casing 71 is connected to the inner end of this pipe 70, in any suitable manner, and the casing is provided with an internal valve seat 72. This valve casing 71 is arranged preferably within the room or building in which my improved cabinet is installed so that the water line will not be subject to freezing in cold weather. An outlet pipe 73 is connected with the valve casing 71, and extends through the wall 66 of the building into the outside flue 65. A T-coupling 74 is connected to the outlet pipe 73 and at its end opposite that with which the outlet pipe 73 connects is disposed a removable screw threaded closure plug 74' having a central aperture 75 therein. The plug 74' carries a bracket 76 which is provided with an inclined or angularly disposed face 77. A valve member 78 cooperates with the aforesaid valve seat 72 in the casing 71 and has a stem 79 slidable through the outlet pipe 73 and the T-coupling 74 and through the aperture 75 in the plug 74'. A controlling lever, including a head 80 and a leg 81, has connection with the stem 79. The head 80 is pivoted at 82 to the outer end of the valve stem 79 and has its opposite end movable into and out of engagement with the said inclined or angularly disposed face 77 of the bracket 76. The head 80 of the said lever is held normally in alignment with the stem 79 with its outer end bearing downwardly against the inclined or angularly disposed face 77 to maintain the valve 78 normally on its seat 72, to prevent the flow of water from the inlet pipe 70 into the valve casing 71. To thus hold the valve seated by the lever 80—81, I provide the T-coupling 74 with a depending screw threaded arm 82, between which and the hooked end 83 of the leg 81 of said lever 80—81, I connect a fusible link 84, of any suitable character, there being a thumb nut 85 between which and a nut 86 on the depending arm 82 the fusible link 84 is held firmly. A nozzle 87 rises from the T-coupling 74 and the movement of the valve 78 from its seat 72 is limited by a collar 88 fixed on the stem 79 for engagement with the inner face of the screw threaded plug 74' whereby the flow of water is not interrupted when the valve 78 is unseated. A packing washer 89 may be disposed between the plug 74' and the stem 79, as shown.

The result is that in the event of a fire in one of the compartments, the gases, fumes, odors and smoke will pass through the duct 64 into the flue 65, the internal pressure shifting the window 66 on its hinge or breaking the glass and passing into the flue 65, the heat of the outgoing gases breaking the fuse link 84. The pressure of the water in the supply pipe 70 against the valve will cause a breaking of the joint 82 between the head 80 of the lever and the stem 79, if the weight of the leg 81 of the lever 80—81 does not cause the outer end of the head 80 to move upwardly away from the inclined or angularly disposed face 77. The movement of the valve 78 is arrested about the center of the valve casing 71 when the collar 88 engages the inner face of the plug 74' when the water from the supply pipe 70 will rush through the outlet pipe 73 into the T-coupling 74 and upwardly through the nozzle 87. The water thus discharged into the flue 65 will act upon the fumes, odors, gases and smoke, to relieve them of impurities and other dangerous elements prior to the discharge of the products of combustion from the flue 65. The descending water from the nozzle will pass out through the pipe 90 at the bottom of the flue, there being a flapper valve 91 at the end of the pipe 70 to permit ready discharge of the water. A sliding door 92 in the lower end of the flue 65 permits ready access to the flue to care for the valve controlled device and the window in the duct 64. In the event that any of the descending water from the flue 65 should enter the outer end of the duct 64, it will be drained off through a pipe 93 from said duct into the lower end of the flue 65. It will be noted that the contracted outer ends of the exhaust chambers 63 project above the bottom wall of the duct 64 to permit the passage of water to pass the same so as to prevent the water from finding its way into the compartments of the cabinets. If water or moisture should find its way into the exhaust chambers 63 it would be prevented from getting into the compartments by reason of the normally closed valves F¹, as previously explained.

Figures 12, 13, 14, 16:
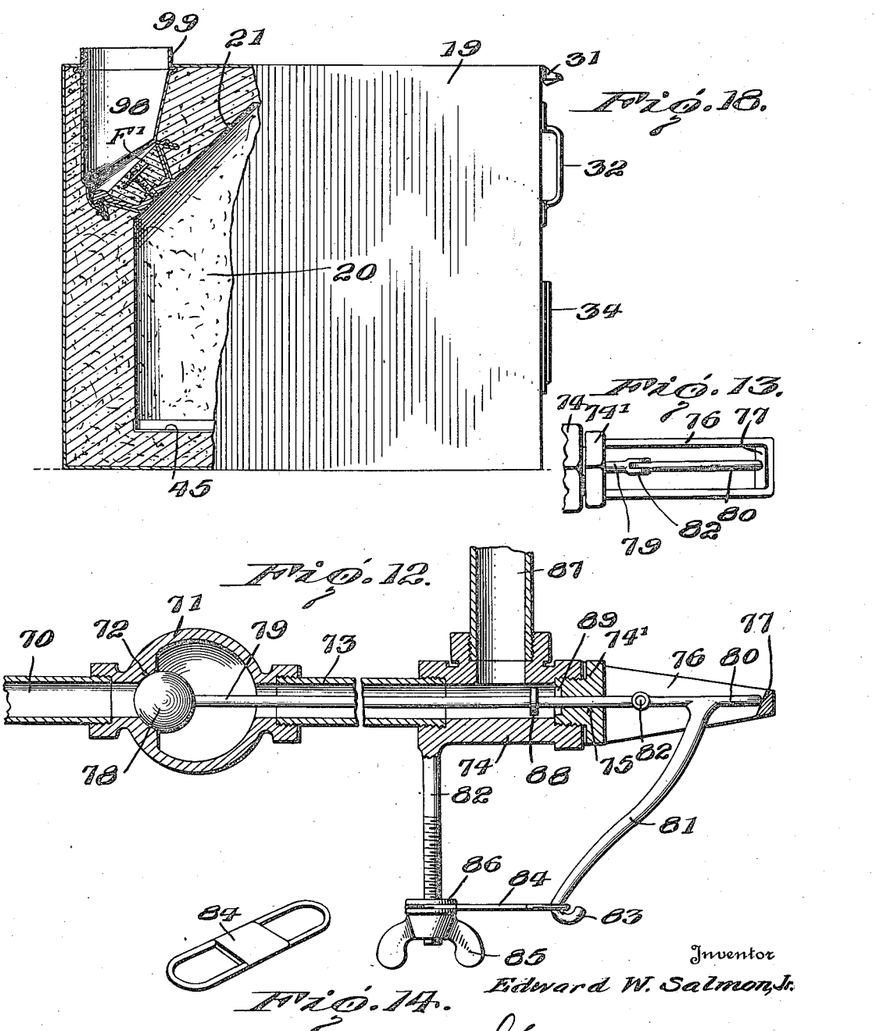
Figure 12 is a view partly in longitudinal section and partly in elevation illustrating the thermo valve controlling device of the system.
Figure 13 is a detail top plan view of the bracket for supporting the lever of the valve controlling device.
Figure 14 is a detail perspective view of the fusible link of the valve controlling device.
Figure 16 is a top plan view of the units or sections of the intermediate or interposed unit or section shown in Fig. 15.
Figure 15:
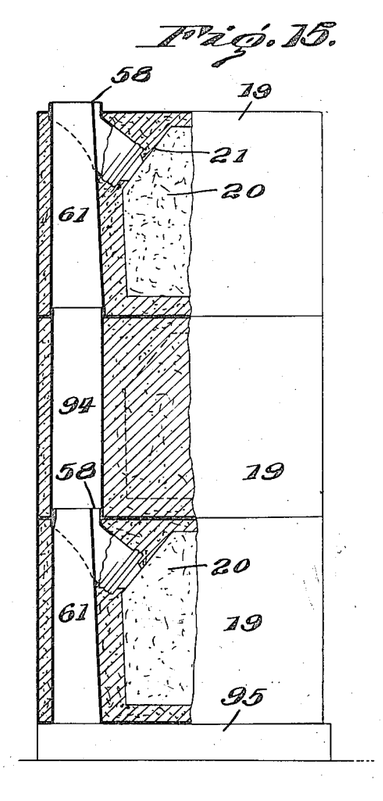
Figure 15 is a view partly in vertical section and partly in elevation on the line 15—15 of Fig. 1.
Figure 16:
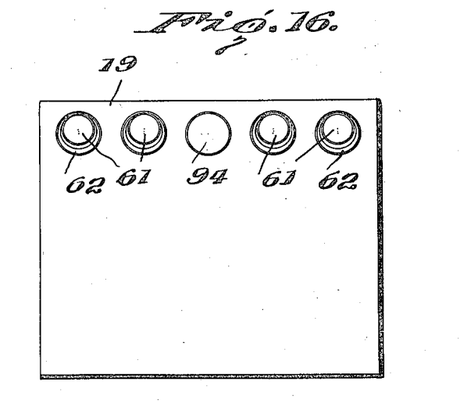
Figure 17:
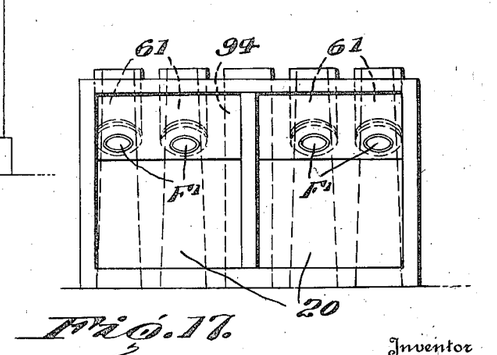
Figure 17 is a front elevation of the compartment shown in Fig. 16, with the door and film or record holders removed.

All of the sections of the cabinets are shown as containing five separate compartments, except the sections $g$, $h$, $i$, $j$ and $k$. As the five compartments of the other sections each has a valve F¹, and as the sections $g$, $h$, $i$, $j$ and $k$, have but two compartments and as the two compartment sections have but four outlets, as compared with the five outlet arrangement of the five compartment sections, and as the two compartment sections may be interchanged, with relation to the five compartment sections, the four compartment units each has a tubular passage 94 midway of its ends to establish a free passage between the tubes 61 in the rear of the intermediate compartments of the five compartment units, as shown in Figs. 15, 16 and 17. In other words, as the five compartment sections have five valved outlets, and as the four compartment sections have only four valved outlets, and as the four compartment sections may be interchanged with the five compartment sections, the tubular passage 94 is placed midway of the ends of the four compartment sections so as not to break communication from a lower tubular passage 61 of a five compartment section through to the duct 64. The lower end of the tubular passage 94 interlocks with the upper end of the respective collar extension 58 of a lower five compartment section, and at its upper end projects slightly above the respective compartments so as to fit in the lower end of the corresponding tubular passage 61 of the five compartment section next above.

As shown in Fig. 1, a base section 95 is provided for each tier of cabinets. This base section 95 is formed of angle iron to give it strength, and if desired, it may have a removable bottom 96 and may or may not be filled with the insulating material of which the walls of the compartment 18 and doors are formed. The bases 95 when disposed in horizontal alinement, may be locked together by bolts 97 to maintain several tiers of compartments in alignment and, if desired, the uppermost section may be provided with a top 98 having such formation as to prevent the placing of papers or other materials on the top of the cabinets.

Instead of mounting the tiers on a base, such as has been described, the lower unit or section may be disposed directly upon the floor, in which event, the tubular passage 61 would be eliminated from the bottom section, as shown in Fig. 18, and in which event, the valved opening from the compartment 20 would lead into an upstanding passage 98, with a collar 99 formed at the top of the section for the purpose of providing for the interlocking connection between superimposed units or sections, it being understood that the lower section would be formed en bloc, and contain a plurality of side by side compartments and when all of the compartments are provided with valves that each compartment has the passage 98 and the collar 99. Where two compartments are formed in the lower unit, as in the form of sections or units $g$, $h$, $i$, $j$ and $k$, there would be a passage corresponding to the passage 94, before described.

Figures 2, 3:
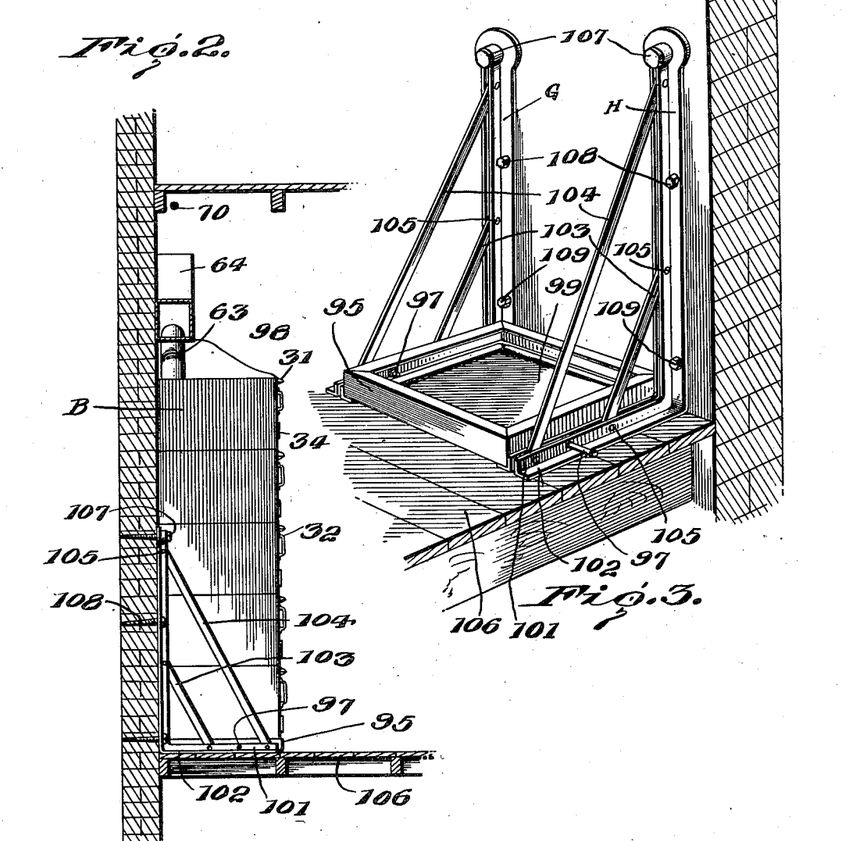
Figure 2 is a vertical sectional view on the line 2—2 of Fig. 1.
Figure 3 is a detail perspective view of one of the hangers for supporting a cabinet from the wall of a building.
Figures 4, 5:
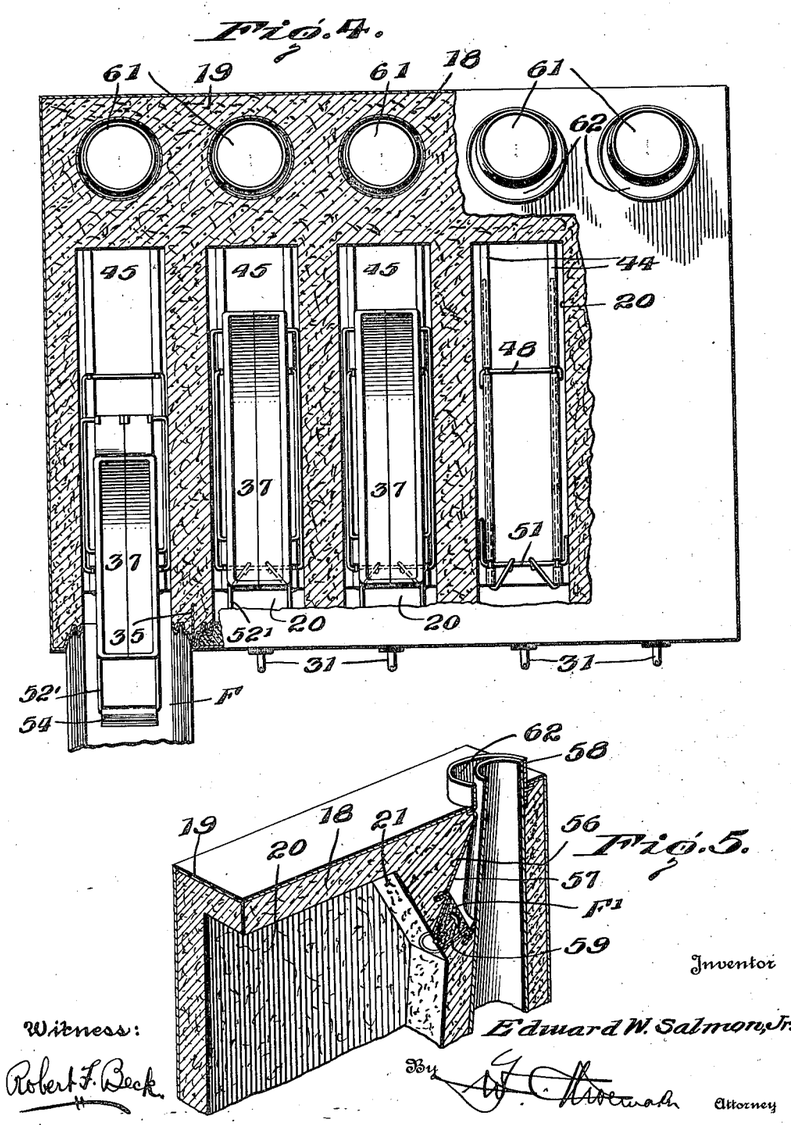
Figure 4 is a view partly in elevation and partly in horizontal section through one of the units or sections, illustrating a door of one of the compartments of the section in open position.
Figure 5 is an enlarged detail fragmentary vertical section through the upper rear corner of one of the compartments of a unit or section.
Figures 6, 7, 10, 11:
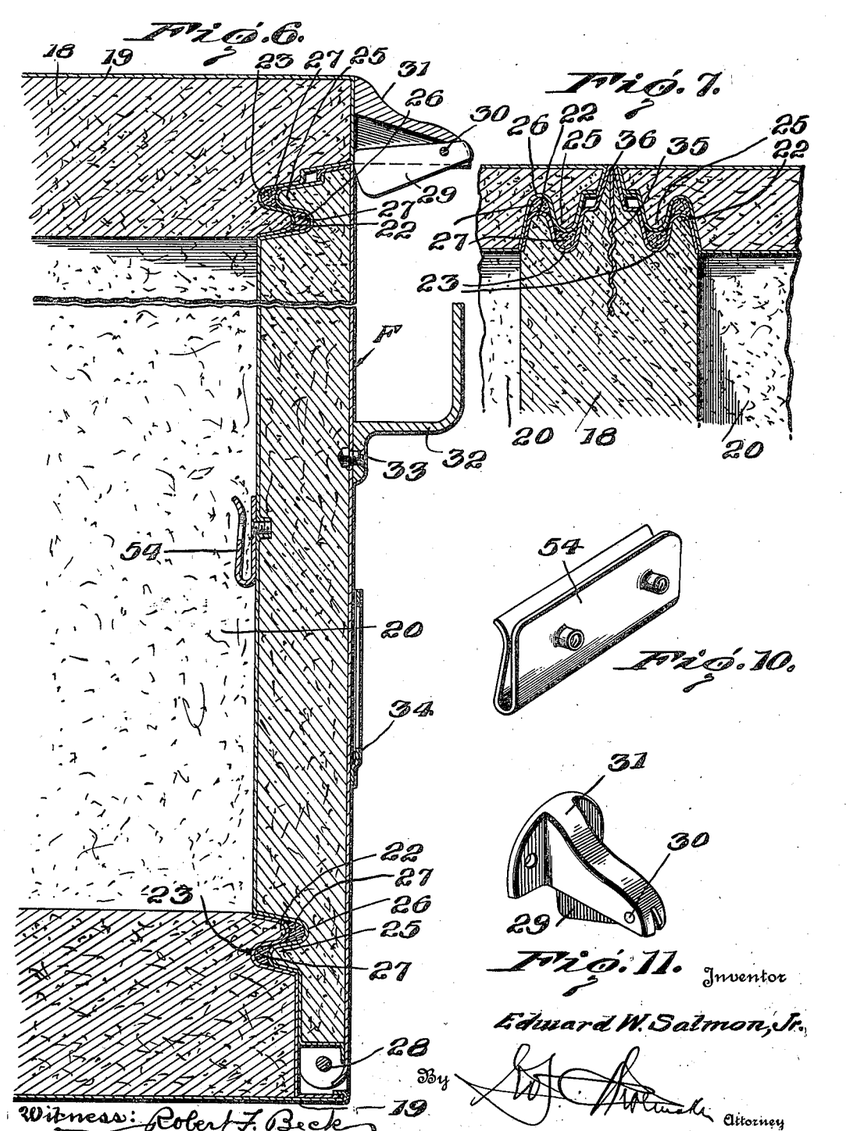
Figure 6 is a greatly enlarged fragmentary vertical sectional view of the front portion of one of the film filing and storage compartments.
Figure 7 is a detail fragmentary horizontal sectional view illustrating the interengaging connection of the sides of the doors of the compartments with the division walls between the compartments and also illustrating a sealing and reinforcing member between the non-combustible and non-heat conducting division wall and the sheet metal covering therefor.
Figure 10 is a detail perspective view of the clip which effects detachable connection between the film or records holder and the door of each compartment.
Figure 11 is a detail perspective view of the locking means designed to maintain the door of each compartment normally locked.

From the foregoing it will be understood that one or any number of tiers of cabinets may be installed in a room or building and that units comprising the cabinets may be of the same or different construction with regard to number of compartments. Any number of sections may be employed, according to the height of the ceiling of the room or building. It will also be understood that ordinarily the cabinets may be erected as hereinbefore described, as regards providing a base unit or the positioning of the lowermost unit directly upon the floor. However, in the event of a fire, the floor upon which the cabinets are supported or the floor above, might give way, and in view of the value of some films, it is desirable to guard against damage incident to a floor beneath the cabinets giving way or because of a falling floor from above. Such consideration is desirable where the cabinets are supported on wood floors. To this end, in one embodiment of the invention, I provide a suitable hanger for each tier of cabinets which I anchor to the side walls of the building. The hanger employed is such as to maintain the tiers of cabinets in alignment and it also has the function of taking the weight of the cabinets to thereby relieve the wood or other floors of the entire weight of the cabinet. In the drawings, particularly in Figs. 1, 2 and 3, I illustrate the preferred form of hanger, and in which, the hanger is composed of two pairs of L-shaped arms G and H, to receive and support a cabinet between them. The arms of each pair are angular in cross section, having upstanding flanges 101 and lateral or base flanges 102 on both sides of the upstanding flanges. The upstanding flanges of each pair of hanger arms are spaced, and inner and outer diagonal braces 103 and 104 respectively are interposed between them and bolted thereto by means of suitable fastenings 105. If the floor 106 should sag downwardly adjacent the side wall, the horizontally extending portions of the L-shaped arms are of sufficient strength as to maintain an even or horizontal support for the cabinet, the vertically extending portions of the arms being bolted securely to the side wall, as 107, 108, and 109, which, with the braces 103 and 104 insure the horizontal support of the cabinet and prevent forward tilting. Whether the floor is level or sags, the hanger takes the weight of the cabinet to an extent to relieve the floor from the weight of the cabinet. The base 95 or the lower section or unit of the cabinet is received by the hanger between the arms and braces and where the bases 95 are employed, the aforesaid pins 97 may extend not only through adjacent bases, but also, through the interposed L-shaped arms. Thus, if the floor under the cabinets should give way and fall, the hangers are adapted to sustain the weight of the cabinets against the side wall of the building as long as the side wall remains standing, thereby saving the cabinets from possible injury.

From the foregoing, it will be seen that the contents of the compartments are not subject to injury either by fire or damage of the cabinets or by reason of climatic conditions and that a fire in any one compartment is confined to such compartment and to the outlets leading therefrom. It will also be seen that by virtue of the non-combustible and non-heat resistance of the walls of the cabinet that if a fire occurred in any one compartment accidentally or due to carelessness, that gases generated to the point of creating internal pressure would automatically egress from the valved compartment, obviating possibility of an explosion, the respective valve yielding under the influence of the expanding gases prior to danger of explosion. It will also be seen that the doors of the compartments are maintained normally closed and are locked automatically as soon as released by an operator and not subject to accidental opening in the event of a fire, earthquake, vibration or from other ordinary causes. It is also apparent that in the event of a fire in a compartment, the same is confined within a given area and that it is readily subdued by a suitable sprinkler system which prevents the discharge of injurious, offensive and dangerous combustible products. It will also be understood that I do not propose to limit myself to sections or units formed en bloc, in all instances; or to limit myself to separable sections, for the reason that the cabinets may be otherwise formed, even to the extent of providing a cabinet having a single compartment, whether of portable type or of stationary type, and involving my principles of sealing the contents of the cabinet against dangers of fires and atmospheric conditions, these contemplations being for interpretation under the spirit and scope of the appended claims.

What is claimed is:

1. In a device of the character described, a plurality of cabinets arranged side by side, each cabinet having a compartment provided with a valved outlet, an exhaust chamber arranged adjacent each cabinet and having communication with the compartments of the respective cabinets, a duct arranged above the cabinets and with which the exhaust chambers of the various cabinets communicate, and a flue with which said duct communicates.

2. A cabinet formed of fire resisting material adapted for the storage and preservation of combustible materials, a suitable closure to seal said cabinet, a flue having communication with the cabinet, a valve normally closing the passage between the cabinet and flue to exclude moisture from without and yet operable under the influence of internal pressure in the cabinet to permit discharge of gases, fumes and odors into the flue, and means constructed and arranged in the line of flow of escaping gases to destroy the hazardous characteristics thereof prior to discharge from the flue.

3. A portable cabinet formed of fire resisting material adapted for the storage and preservation of combustible materials, said cabinet having a compartment to receive the subject matter to be contained therein, a tubular passage leading from the compartment upwardly through the top of the cabinet and terminating slightly above the top of the cabinet, a normally closed valve disposed between the passage and the compartment, a second passage disposed in the rear of the compartment with its upper end located within the aforesaid passage, and a suitable closure to seal said compartment.

4. In a device of the character described, a plurality of superimposed compartments, a tubular member embedded in each compartment forming a passage, the passages of the compartments aligning, the upper end of the tube of the lowermost compartment projecting into the lower end of the tube of the compartment next above, the lowermost compartment having a valved outlet leading into the tubular member of the compartment next above, the uppermost compartment also having a valved outlet, the valves of said valved outlets being operable to open under the influence of internal pressure within the respective compartments to effect discharge of gases from such compartment, and a flue having communication with the uppermost passage to convey the hazardous elements away from the device.

5. A portable cabinet formed of fire resisting material adapted for the storage and preservation of combustible materials, said cabinet having a compartment to receive the subject matter to be contained therein, a suitable closure to seal said compartment, the cabinet having a passage formed therein leading from the compartment and also provided with a port at the inner end of the passage to establish communication between the compartment and the passage, a valve to normally close said port, an exhaust chamber having a communication with said passage, and a duct into which the exhaust chamber projects, whereby to carry off gases, fumes and odors to the atmosphere.

6. A portable cabinet formed of fire resisting material adapted for the storage and preservation of combustible materials, said cabinet having a compartment to receive the subject matter to be contained therein, a suitable closure to seal said compartment, the cabinet having a passage formed therein leading from the compartment and also provided with a port at the inner end of the passage to establish communication between the compartment and the passage, a valve to normally close said port, an exhaust chamber having a communication with said passage, a duct into which the exhaust chamber projects, whereby to carry off gases, fumes and odors to the atmosphere, and a member disposed in said duct in advance of the exhaust chamber to normally exclude moisture from the duct and operable under the influence of the pressure of gases, fumes and odors to permit discharge of fumes, odors and gases from the duct.

7. A portable cabinet formed of fire resisting material adapted for the storage and preservation of combustible materials, said cabinet having a compartment to receive the subject matter to be contained therein, a suitable closure to seal said compartment, the cabinet having a passage formed therein leading from the compartment and also provided with a port at the inner end of the passage to establish communication between the compartment and the passage, a valve to normally close said port, an exhaust chamber having a communication with said passage, a duct into which the exhaust chamber projects, whereby to carry off gases, fumes and odors to the atmosphere, a member disposed in said duct in advance of the exhaust chamber to normally exclude moisture from the duct and operable under the influence of the pressure of gases, fumes and odors to permit discharge of fumes, odors and gases from the duct, a flue having communication with the outer end of the duct, and a sprinkler nozzle arranged in the flue adjacent the outer end of the duct, the flue having a valved outlet.

8. A portable cabinet formed of fire resisting material adapted for the storage and preservation of combustible materials, said cabinet having a compartment to receive the subject matter to be contained therein, a suitable closure to seal said compartment, the cabinet having a passage formed therein leading from the compartment and also provided with a port at the inner end of the passage to establish communication between the compartment and the passage, a valve to normally close said port, an exhaust chamber having a communication with said passage, a duct into which the exhaust chamber projects, whereby to carry off gases, fumes and odors to the atmosphere, a flue arranged exteriorly of the building in which the cabinet is located and having communication with the duct, and a sprinkler nozzle disposed in the flue adjacent the outer end of the duct, the flue having a valved outlet.

9. A portable cabinet formed of fire resisting material adapted for the storage and preservation of combustible materials, said cabinet having a compartment to receive the subject matter to be contained therein, a suitable closure for said compartment, the cabinet having a passage formed therein leading from the compartment and also provided with a port at the inner end of the passage to establish communication between the compartment and the passage, a valve to normally close said port, an exhaust chamber having a communication with said passage, a duct into which the exhaust chamber projects, whereby to carry off gases, fumes and odors to the atmosphere, a flue arranged exteriorly of the building in which the cabinet is located and having communication with the duct, a sprinkler nozzle disposed in the flue adjacent the outer end of the duct, the flue having a valved outlet and also provided with an opening adjacent the valved outlet, and a door for the opening in the flue.

10. In a device of the character described, a plurality of cabinets arranged side by side, each cabinet having a compartment provided with a valved outlet, an exhaust chamber arranged adjacent each cabinet and having communication with the compartments of the respective cabinets, a duct arranged above the cabinets and into which the exhaust chambers of the various cabinets project, and a flue with which the said duct communicates.

11. In a device of the character described, a plurality of cabinets arranged side by side, each cabinet having a compartment provided with a valved outlet, an exhaust chamber arranged adjacent each cabinet and having communication with the compartments of the respective cabinets, a duct arranged above the cabinets and into which the exhaust chambers of the various cabinets project, a flue with which the said duct communicates, and a shiftable closure arranged in the duct to normally prevent the ingress of moisture and yet permit the exhaust of gases generated by combustion in any of the cabinets.

12. In a device of the character described, a plurality of cabinets arranged side by side, each cabinet having a compartment provided with a valved outlet, an exhaust chamber arranged adjacent each cabinet and having communication with the compartments of the respective cabinets, a duct arranged above the cabinets and into which the exhaust chambers of the various cabinets project, a flue with which the said duct communicates, and means for supporting the cabinets from a side wall to relieve the floor of the weight of the cabinets.

13. In a device of the character described, a plurality of cabinets arranged side by side, each cabinet having a compartment provided with a valved outlet, an exhaust chamber arranged adjacent each cabinet and having communication with the compartments of the respective cabinets, a duct arranged above the cabinets and into which the exhaust chambers of the various cabinets project, a flue with which the said duct communicates, and a sprinkler nozzle disposed in the flue adjacent the outer end of the duct.

14. In a device of the character described, a cabinet composed of a plurality of superimposed compartments each provided with a valved outlet, an exhaust chamber arranged adjacent the cabinet and having communication with the compartments at the points of the valved outlets, a duct having communication with the exhaust chamber, the valve of each compartment being adapted to operate under the influence of internal pressure within the respective compartment to effect discharge of gases from such compartment, and means constructed and arranged to operate automatically upon the escaping gases passing through the duct to destroy the hazardous elements of the escaping gases.

15. A portable cabinet formed of fire resisting material adapted for the storage and preservation of combustible materials to receive subject matter to be contained therein, a suitable closure for said cabinet, the cabinet having a passage leading therefrom, a valve to normally close said passage, an exhaust chamber having communication with said passage, a duct with which said exhaust chamber communicates, and a member disposed in said duct in advance of the exhaust chamber to normally exclude moisture from the duct and operable under the influence of the pressure of gases to permit discharge of fumes, odors and gases from the duct.

16. A portable cabinet formed of fire resisting material adapted for the storage and preservation of combustible materials to receive subject matter to be contained therein, a suitable closure for said cabinet, the cabinet having a passage leading therefrom, a valve to normally close said passage, an exhaust chamber having communication with said passage, a duct with which said exhaust chamber communicates, a member disposed in said duct in advance of the exhaust chamber to normally exclude moisture from the duct and operable under the influence of the pressure of gases to permit discharge of fumes, odors and gases from the duct, a flue having communication with the duct, and means in the flue operable automatically to destroy the dangerous elements and offensive characteristics of the discharged combustion elements.

17. A cabinet formed of fire resisting material adapted for the storage and preservation of combustible materials, a suitable closure to seal said cabinet, a flue arranged exteriorly of the building in which the cabinet is located and having communication with the cabinet, a valve normally closing said passage to exclude moisture from without and yet operable under the influence of internal pressure in the cabinet to permit discharge of gases, fumes and odors into the flue and a water sprinkling device disposed in the flue operable automatically to act upon the gases passing through the flue to destroy the hazardous and offensive characteristics thereof.

18. A cabinet formed of fire resisting material adapted for the storage and preservation of combustible materials, a suitable closure to seal said cabinet, a flue arranged exteriorly of the building in which the cabinet is located and having communication with the cabinet, a valve normally closing said passage to exclude moisture from without and yet operable under the influence of internal pressure in the cabinet to permit discharge of gases, fumes and odors into the flue, and means constructed and arranged in the line of flow of escaping gases to operate automatically for action upon the escaping gases to destroy the hazardous characteristics thereof prior to discharge from the flue.

19. A cabinet formed of fire resisting material adapted for the storage and preservation of combustible materials, a suitable closure to seal said cabinet, a flue arranged exteriorly of the building in which the cabinet is located and having communication with the cabinet, a valve normally closing said passage to exclude moisture from without and yet operable under the influence of internal pressure in the cabinet to permit discharge of gases, fumes and odors into the flue, and means constructed and arranged in the line of flow of escaping gases to operate automatically for action upon the escaping gases to destroy the hazardous characteristics thereof prior to discharge from the flue, the flue having a valved outlet and also provided with an opening adjacent the valved outlet and a closure for the opening in the flue.

20. In a device of the character described, a plurality of cabinets, each cabinet having a compartment provided with a valved outlet, an exhaust chamber arranged adjacent each cabinet and having communication therewith, a duct having communication with the exhaust chambers, a flue with which said duct communicates, and means in the flue operable automatically upon discharge of gases from any one of the cabinets to destroy the hazardous elements of the escaping gases.

21. In a device of the character described, a plurality of cabinets each provided with a valved outlet, an exhaust chamber arranged adjacent each cabinet and having communication with the respective cabinets at the points of the valved outlets, a duct having communication with the exhaust chambers of the various cabinets, the valve of each cabinet being adapted to operate under the influence of internal pressure within the respective cabinet to effect discharge of gases from such cabinet and means constructed and arranged to operate automatically upon the escaping gases passing through the duct to destroy the hazardous elements of the escaping gases.

22. In a device of the character described, a plurality of superimposed units, each unit having a plurality of compartments, each unit also having a plurality of tubes embedded therein between the rear wall of the units and the respective compartments, the tubes forming passages and having their upper ends projecting into the lower ends of the respective tubes of the unit next above whereby to form a continuous passage and to provide an interlocking connection between the respective units, the compartments of the lowermost unit each having a valved outlet leading into the respective tubes of the compartment next above, the compartments of the uppermost unit also each having a valved outlet, the valves of said valved outlets being operable to open under the influence of internal pressure within the respective compartments to effect discharge of gases from the respective compartments, and a flue having communication with the tubes of the uppermost unit to convey the hazardous elements away from the device.

23. In a device of the character described, a plurality of superimposed compartments, a tubular member embedded in each compartment, the tubes aligning to form a continuous passage, the tube of the lowermost compartment projecting into the lower end of the tube of the compartment next above, the lowermost compartment having a valved outlet leading into the tube of the compartment next above, a sheet metal lining for said outlet which embraces the upper end of the adjacent tube of such compartment and which projects into the lower end of the tube of the compartment next above to form a crescent shaped opening establishing communication between the valved outlet of the lowermost compartment and the tube of the compartment next above, the uppermost compartment also having a valved outlet, the valves of said valved outlets being operable to open under the influence of internal pressure within the respective compartments to effect discharge of gases from the respective compartments, and a flue having communication with the tube of the compartment to convey the hazardous elements away from the device.

24. A portable fireproof cabinet for the storage and preservation of motion picture films, the cabinet being formed en bloc and having a division wall to dispose the compartments side by side, the cabinet including its division wall being formed of non-combustible, non-heat conducting material so as to prevent conduction of heat through the walls of the cabinet, each compartment having an outlet, a metallic envelope for the cabinet including the front edge of said division wall, and also covering the walls of said outlet, and a fireproof closure for each compartment.

25. A storage and filing cabinet comprising a compartment formed en bloc and composed of non-combustible, non-heat conducting material so as to prevent conduction of heat through the walls of the compartment, the compartment having an outlet and a valve seat in the outlet and a metallic envelope for the compartment including the outlet and the valve seat.

In testimony whereof I have hereunto set my hand.

EDWARD W. SALMON, Jr.